(12) United States Patent
Bae et al.

(10) Patent No.: US 8,854,509 B2
(45) Date of Patent: Oct. 7, 2014

(54) IMAGE PICKUP APPARATUS, METHOD OF PERFORMING IMAGE COMPENSATION, AND COMPUTER READABLE RECORDING MEDIUM

(75) Inventors: Jum-han Bae, Seongnam-si (KR); Ki-ho Kim, Seoul (KR); June-hee Lee, Suwon-si (KR); Kyu-yul Choi, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 34 days.

(21) Appl. No.: 13/553,909

(22) Filed: Jul. 20, 2012

(65) Prior Publication Data

US 2013/0155265 A1 Jun. 20, 2013

(30) Foreign Application Priority Data

Dec. 16, 2011 (KR) ........................ 10-2011-0136695

(51) Int. Cl.
*H04N 9/64* (2006.01)
(52) U.S. Cl.
USPC .......................... 348/246; 348/241
(58) Field of Classification Search
CPC .. H04N 5/2176; H04N 5/365; H04N 5/23245
USPC .................... 348/208.11, 246, 241
See application file for complete search history.

(56) References Cited

U.S. PATENT DOCUMENTS

| | | | |
|---|---|---|---|
| 8,081,229 B2 * | 12/2011 | Ohta | 348/222.1 |
| 8,081,232 B2 | 12/2011 | Sakamoto et al. | |
| 2007/0013795 A1 | 1/2007 | Sakamoto et al. | |
| 2009/0051791 A1 * | 2/2009 | Ohta | 348/246 |
| 2010/0253814 A1 | 10/2010 | Sakamoto et al. | |
| 2011/0235912 A1 * | 9/2011 | Bigioi et al. | 382/173 |
| 2011/0267511 A1 * | 11/2011 | Imafuji | 348/294 |

FOREIGN PATENT DOCUMENTS

| | | |
|---|---|---|
| JP | 2007-027815 | 2/2007 |
| JP | 2008-283477 | 11/2008 |
| JP | 2008283477 A * | 11/2008 |
| JP | 2008-306508 | 12/2008 |

OTHER PUBLICATIONS

Search Report and Written Opinion dated Feb. 22, 2013 issued in International Application No. PCT/KR2012/010220.

* cited by examiner

*Primary Examiner* — Antoinette Spinks
(74) *Attorney, Agent, or Firm* — Stanzione & Kim, LLP

(57) ABSTRACT

An image pickup apparatus includes an image pickup unit to continuously pick up a plurality of images having mutual displacement using an image pickup device, a storage unit to store a position of a defect area of the image pickup device, and an image compensation unit to compensate for the defect area in one of the plurality of picked images using the other picked image.

19 Claims, 12 Drawing Sheets

(a)

(b)

IMAGE PICKUP APPARATUS, METHOD OF PERFORMING IMAGE COMPENSATION, AND COMPUTER READABLE RECORDING MEDIUM

CROSS-REFERENCE TO RELATED APPLICATIONS

This application claims priority under 35 U.S.C.§119(a) from Korean Patent Application No.2011-0136695, filed on Dec. 16, 2011, in the Korean Intellectual Property Office, the disclosure of which is incorporated herein by reference in its entirety.

BACKGROUND

1. Field

The present general inventive concept relates generally to an image pickup apparatus, a method of performing image compensation, and a computer readable recording medium, and more particularly to an image pickup apparatus, a method of performing image compensation, and a computer readable recording medium, to correct a defect of an image sensor by continuously picking up a plurality of images.

2. Description of the Related Art

A conventional image pickup device refers to a component that generates an image in a mobile phone camera or a Digital Still Camera (DSC). The image pickup device may be a Charged Coupled Device (CCD) image pickup device or a Complementary Metal Oxide Semiconductor (CMOS) image pickup device.

The CCD is a device in which Metal Oxide Silicon (MOS) capacitors are positioned very closely and charge carriers are stored in and transferred to the capacitors. The CMOS image sensor is a device in which MOS transistors, a number thereof which corresponds to a number of pixels, are provided using a CMOS technology that uses a control circuit and a signal processing circuit as peripheral circuits, and a switching method of sequentially detecting outputs using the MOS transistors is thereby adopted.

Recently, digital cameras adopt image sensors having sizes of 1/2.33 inch, 1/1.8 inch, 21.5×14.4 mm (i.e., an Advanced Photo System type-C, a.k.a., APS-C), and 35×24 mm (i.e., a full frame). The size of such an image sensor corresponds to a size of a chip die, and if the size of the chip die is large, a production yield is greatly degraded. For example, in the case of a normal system on a chip (SoC), if the size is larger than 8 mm×8 mm, mass production may not be possible.

Considering this point, in the related art, a defect area in the image pickup device is corrected by using a pixel value of an adjacent pixel having no defect. However, correcting the defect of the image pickup device by using only the adjacent pixel causes a problem such that in the case of intentionally putting a defect area as in a phase-difference AF (Auto Focus) sensor, a pixel corresponding to the phase-difference AF appears as a defect even at a low sensitivity (ISO) with sufficient light quantity, and this causes a bad influence on the picture quality.

SUMMARY

The present general inventive concept provides an image pickup apparatus, a method of performing image compensation, and a computer readable recording medium, which can correct a defect of an image sensor by continuously picking up a plurality of images.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an image pickup apparatus including an image pickup unit to continuously pick up a plurality of images having mutual displacement therebetween using an image pickup device, a storage unit to store a position of a defect area of the image pickup device, and an image compensation unit to compensate for the defect area in one of the plurality of picked up images using another one of the plurality of picked up images.

The plurality of picked up images may include a first image and a second image, and the image compensation unit may compensate for the first image according to the mutual displacement, calculate a pixel value of the compensated first image that corresponds to the defect area of the second image, and substitute the calculated pixel value for the defect area of the second image.

Each of the plurality of picked up images may be a full-frame image through a shutter operation.

At least one of the plurality of picked up images may be a full-frame image through a shutter operation, and the other of the plurality of picked up images may be a live-view image for live-view display.

The live-view image may be a small-size live-view that is displayed when a shutter is released or a full-side live-view that is displayed when a half-press shutter is input.

The live-view image may be an image that is picked up just before the full-frame image is picked up.

The live-view image may be an image that is picked up after the full-frame image is picked up.

The image pickup apparatus according to the aspect of the present invention may further include a sensing unit to sense movement of the image pickup apparatus; and an OIS (Optical Image Stabilizer) unit to move an image pickup direction of the image pickup apparatus as much as a preset displacement so that the mutual displacement exists between the plurality of picked images if the movement of the image pickup apparatus is not sensed.

The image pickup apparatus according to the aspect of the present invention may further include a user interface unit to display a live-view image picked up by the image pickup unit.

The image pickup apparatus according to the aspect of the present invention may further include a control unit to control the image pickup unit to pick up a full-frame image through a shutter operation after the live-view image being displayed is stored as a first image if a shutter command is input while the live-view is displayed.

The storage unit may store a position of at least one of a white pixel defect area of the image pickup device, a black pixel defect area of the image pickup device, and an AF phase-difference defect area.

The foregoing and/or other features and utilities of the present general inventive concept may also be achieved by providing a method of performing image compensation in an image pickup apparatus includes continuously picking up and storing a plurality of images having mutual displacement therebetween using an image pickup device, and compensating for a defect area in one of the plurality of picked up images using another one of the plurality of picked up images.

The plurality of picked images may include a first image and a second image, and the compensating may include moving the first image according to the mutual displacement, calculating a pixel value of the moved first image that corresponds to the defect area of the second image, and substituting the calculated pixel value for the defect area of the second image.

Each of the plurality of picked up images may be a full-frame image through a shutter operation.

At least one of the plurality of picked up images may be a full-frame image through a shutter operation, and the other of the plurality of picked up images may be a live-view image for live-view display.

The live-view image may be a small-size live-view that is displayed when a shutter is released or a full-side live-view that is displayed when a half-press shutter is input.

The live-view image may be an image that is picked up just before the full-frame image is picked up.

The live-view image may be an image that is picked up after the full-frame image is picked up.

The method of performing image compensation may further include sensing movement of the image pickup apparatus, and moving an image pickup direction of the image pickup apparatus as much as a preset displacement so that the mutual displacement exists between the plurality of picked images if the movement of the image pickup apparatus is not sensed.

The method of performing compensation may further include displaying a live-view image picked up by the image pickup unit.

The picking up and storing step may including picking up and storing a full-frame image through a shutter operation after the live-view image being displayed is stored as a first image if a shutter command is input while the live-view is displayed.

The defect area may be at least one of a white pixel defect area of the image pickup device, a black pixel defect area of the image pickup device, and an AF phase-difference defect area.

The foregoing and/or other aspects and utilities of the present general inventive concept may also be achieved by providing a non-transitory computer readable recording medium including computer-readable codes to execute a method of performing image compensation, wherein the method includes continuously picking up and storing a plurality of images having mutual displacement therebetween using an image pickup device, and compensating for a defect area in one of the plurality of picked up images using another one of the plurality of picked up images.

The foregoing and/or other features and utilities of the present general inventive concept may also be achieved by providing an image pickup apparatus to generate a corrected final image of an object, including an image pickup device including a predetermined defect area to capture at least first and second images of the object, such that the second image is displaced from the first image by a certain distance with respect to the defect area as applied to the first image, and an image compensation unit to move a position of the second image in a direction opposite to the displacement to correspond to the defect area in order to generate the corrected final image of the object.

The image compensation unit may further include a compensation processor to calculate a pixel value of the second image that corresponds to the position of the defect area by mapping the second image onto the first image, and to substitute the calculated pixel value of the second image for the defect area of the first image.

The first image may be generated after a shutter command is input by a user, and the second image may be a final live-view image generated prior to the inputting of the shutter command.

The image pickup apparatus may further include a sensing unit to sense the displacement of the second image by detecting a movement of the image pickup apparatus.

BRIEF DESCRIPTION OF THE DRAWINGS

The above and/or other features and utilities of the present general inventive concept will become apparent and more readily appreciated from the following description of the embodiments, taken in conjunction with the accompanying drawings of which:

FIGS. 7 through 9D are diagrams illustrating an operation of an image compensation unit in FIG. 1;

DETAILED DESCRIPTION OF THE PREFERRED EMBODIMENTS

Figure 1:
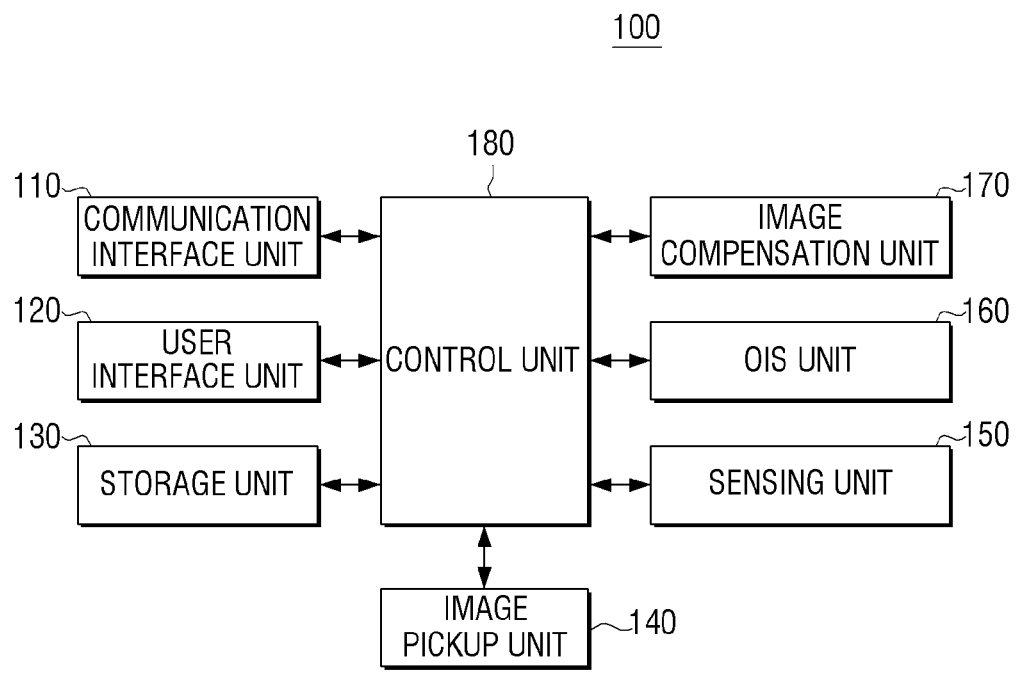
FIG. 1 is a block diagram illustrating a configuration of an image pickup apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a configuration of an image pickup apparatus 100 according to an exemplary embodiment of the present general inventive concept.

Referring to FIG. 1, the image pickup apparatus 100 includes a communication interface unit 110, a user interface unit 120, a storage unit 130, an image pickup unit 140, a sensing unit 150, an Optical Image Stabilizer (OIS) unit 160, an image compensation unit 170, and a control unit 180. The image pickup apparatus 100 according to FIG. 1 may include a digital camera, a camcorder, a mobile phone, a PMP, a web cam, a black box, etc., which can continuously pick up a plurality of images, but is not limited thereto.

The communication interface unit 110 is formed to connect to at least one external terminal device 50. The communication interface unit 110 can connect to the external terminal device 50 wirelessly or by wire through a Local Area Network (LAN) and the Internet, and can also connect to the external terminal device 50 through a Universal Serial Bus (USB) port and a Bluetooth module.

Further, the communication interface unit 110 transmits content stored in the image pickup apparatus 100 to the external terminal device 50. Specifically, the communication interface unit 110 may transmit an image file stored in the storage unit 130 to be described later to the external terminal device 50 or a server. Here, the content may be still-image content or moving-image content generated by the image pickup apparatus 100.

The user interface unit 120 has a large number of function keys to set or select various kinds of functions that are supported by the image pickup apparatus 100. The user interface unit 120 may be implemented by a device that can simultaneously perform input and output such as a touch pad or a mouse roller-ball, but is not limited thereto, and may be implemented by an input configuration such as a large number of buttons and a display configuration such as a Liquid Crystal Diode (LCD) or an Organic Light Emitting Diode (OLED) in association with each other, but is not limited thereto.

The user interface unit 120 receives various kinds of control commands from a user, such as a live-view display command, a half-press shutter command (a.k.a., an auto focusing command), and a shutter command (a.k.a., a full shutter press, or image pickup command). Further, the user interface unit 120 receives an input of settings related to the image pickup. Specifically, the user interface unit 120 may receive inputs, such as a particular file format in which the picked up image is stored, resolution of the picked up image, whether to apply image compensation/correction according an embodiment of the present general inventive concept, whether to perform digital zooming, automatic white balance (AWB), automatic focus (AF), and automatic exposure (AE), but is not limited thereto.

Also, the user interface unit 120 may display the picked up image. Specifically, the user interface unit 120 may display the picked up image according to a user's image pickup command or an image corrected by the image compensation unit 170 to be described later.

Further, the user interface unit 120 may display various kinds of content stored in the storage unit 130 according to a user's reproduction command. The content may include still-image content or moving-image content. For example, if the image pickup apparatus 100 captures and stores a moving image in the storage unit 130, the user interface unit 120 may reproduce the moving image content that is stored in the storage unit 130.

Further, the user interface unit 120 may display a live-view image. Specifically, the user interface unit 120 may display the live-view image that is picked up by the image pickup unit 140 in response to a user's live-view display command, and may include an image displayed in real-time. Here, the live-view is a function of displaying the image that is picked up by the image pickup unit 140 on a user interface window rather than a viewfinder, and may be divided into a full-size live-view and a small-size live-view.

The full-size live-view includes an operation of picking up and displaying an image with high resolution after a user's half-press shutter command is input, and the small-size live-view includes an operation of displaying an image with low resolution during a shutter release in which the half-press shutter or shutter command is not input. Accordingly, the user interface unit 120 displays a small-size live-view image according to a small-size live-view function during the shutter release, and displays a full-size live-view image according to a full-size live-view function during the half-press shutter command. In contrast, the resolution of the full-size live-view and the resolution of the small-size live-view may be changed according to particular functions of the image pickup apparatus 100, and an optimum resolution may be selected according to a manufacturer's specifications with regard to the image pickup apparatus 100.

The storage unit 130 stores a plurality of picked up images. Specifically, the storage unit 130 may temporarily store the plurality of images picked up by the image pickup unit 140 according to a pickup order or a type of image pickup (or operation state). Here, the type of image pickup may be divided into a full-frame image pickup and a live-view image pickup, or may be divided into a full-frame image pickup, a small size live-view image pickup, and a small-size live-view image pickup, and a full-size live-view image pickup. Here, the full-frame image pickup is a basic still image pickup operation.

Further, the storage unit 130 may store images corrected by the image compensation unit 170. The storage unit 130 may also store the content that is finally generated by the image compensation unit 170 (i.e., a compressed form of the picked up image).

Further, the storage unit 130 stores information corresponding to a defect of the image pickup apparatus 100. Specifically, the storage unit 130 may store position information of defect areas of the image pickup apparatus 100, such as a white pixel defect area, a black pixel defect area, and an AF phase-difference defect area. Such information on the defect area may be pre-generated and stored by the manufacturer, and may be updated by a user's test operation.

Figure 10:
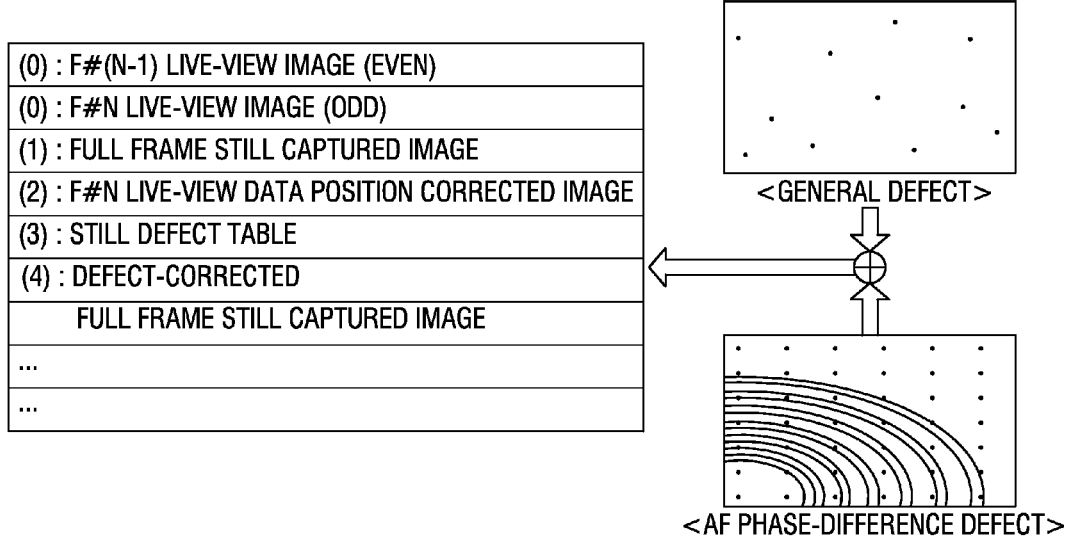
FIG. 10 is a diagram illustrating an example of a storage area of a storage unit in FIG. 1.

The storage unit 130 as described above may be implemented by a storage medium in the image pickup apparatus 100 and an external storage medium, for example, such as a removable disk including a USB memory and a flash memory, a storage medium connected to the image pickup apparatus 100, a web server through a network, or the like. Further, the storage unit 130 may include a plurality of storage spaces as illustrated in FIG. 10, and may store the captured image and information corresponding to the defect area. Further, the storage unit 130 may include a volatile memory (e.g., DRAM) to drive the image processing unit 170 and the control unit 180.

Figure 2:
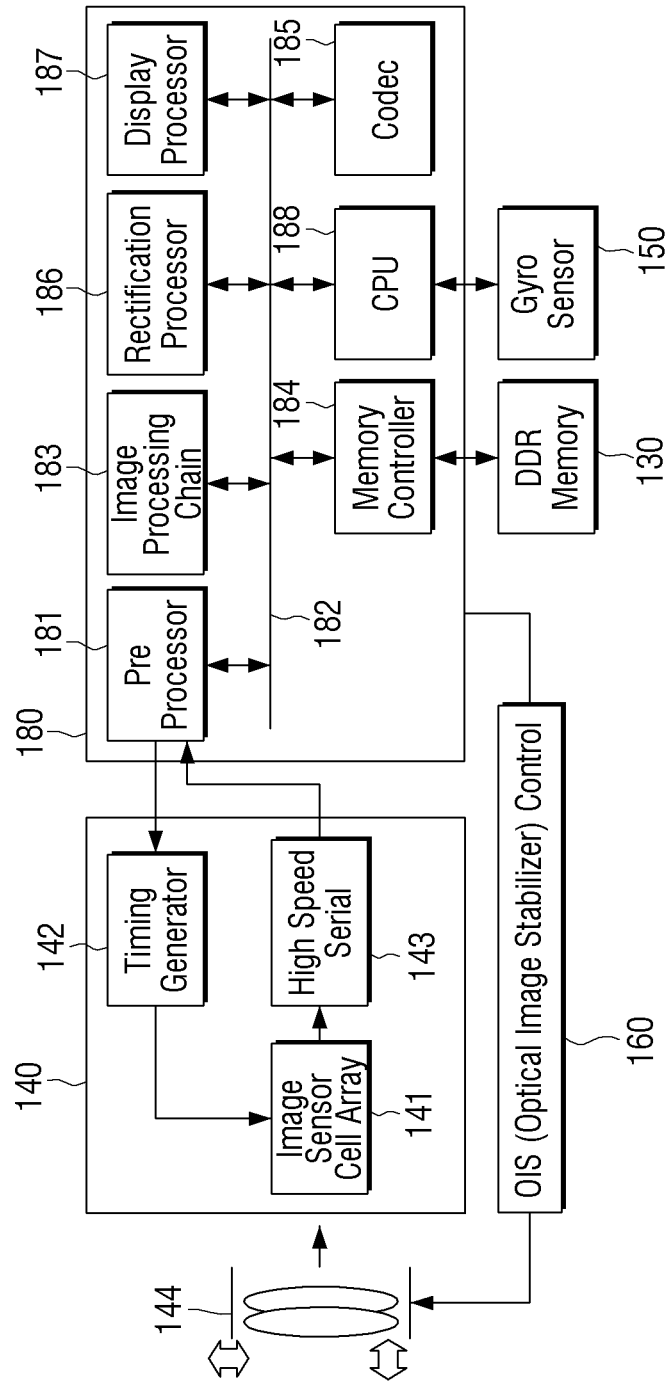
FIG. 2 is a diagram illustrating the detailed configuration of an image pickup unit and a control unit in FIG. 1.

The image pickup unit 140 continuously picks up a plurality of images having mutual displacement therebetween using an image pickup device 141. Referring to FIGS. 1 and 2, the image pickup unit 140 may include a lens unit 144 including a lens or a plurality of lenses to gather light from an object and may form an optical image on an image pickup area, the image pickup device 141 to perform photoelectric conversion of the light incident through the lens into an electrical signal, and an analog-to-digital (A/D) converter 145 to convert an analog signal from the image pickup device 141 into a digital signal. The image pickup device 141 may be a Charged Coupled Device (CCD) or a Charged Coupled Device (CCD).

The image pickup unit 140 may generate a full-frame image or a live-view image according to an operation state of the image pickup apparatus 100. Detailed image pickup operations of the image pickup unit 140 according to various operation states will be described later with reference to FIGS. 3 through 6.

The sensing unit 150 senses movement of the image pickup apparatus 100. Specifically, the sensing unit 150 may sense the movement of the image pickup apparatus 100 using a gyro sensor, an acoustic sensor, an optical sensor, a magnetic sensor, a triboelectric sensor, an inertia-switch sensor, etc., but is not limited thereto, and may sense the displacement of the image pickup apparatus 100 between the image pickup operations of the plurality of images.

The OIS unit 160 compensates for the movement of the image pickup apparatus 100 by changing a path of light received by the image pickup unit 140. Specifically, if a shaking of the image pickup apparatus 100 is sensed by the sensing unit 150, the movement of the image pickup apparatus 100 can be compensated for by changing a direction that the path of light is provided to the image pickup unit 140 by providing the light in a direction opposite to the shaking.

On the other hand, according to an exemplary embodiment of the present general inventive concept, in order to compensate for a defect area of the image pickup device 141, at least two images having mutual displacement therebetween are used. Accordingly, the OIS unit 160 may move the image pickup direction of the image pickup device 141 as much as a preset displacement so that the mutual displacement exists between the plurality of picked up images if the movement of the image pickup apparatus 100 is not sensed by the sensing unit 150, that is, if the image pickup apparatus 100 is fixed by a tripod, etc. Such displacement movement in the image pickup direction is to allow the mutual displacement to exist between the images, while not having the displacement exist during a single image pickup process. Accordingly, the OIS unit 160 can perform the above-described motion compensation operation during a single image pickup process.

On the other hand, in this exemplary embodiment of the present general inventive concept, it is exemplified that the mutual displacement is made to exist between the plurality of images using the OIS function. However, the mutual displacement may be implemented to exist between the plurality of images using a microelectromechanical system (MEMS) structure that enables the images to move with respect to each other. Further, when the image pickup apparatus 100 is not fixed to the tripod, the displacement naturally exists between the picked up images as a result of the user's hand shaking when holding the image pickup apparatus 100, and in this case, the OIS function to separately move the image pickup direction of the image pickup device 141 is not required.

The image compensation unit 170 compensates for a defect area in one of the plurality of picked up images using another picked up image. Specifically, in order to map one image of the plurality of images (i.e., a first image or an auxiliary image, hereinafter called a "main image") together with another image (i.e., a second image or a main image, hereinafter called an "auxiliary image"), the image compensation unit 170 compensates for a movement of the image pickup apparatus 100 resulting in a displacement of the auxiliary image that corresponds to the displacement sensed by the sensing unit 150, calculates a pixel value of the auxiliary image that corresponds to the position of the defect area of the main image by mapping the compensated (i.e., moved) auxiliary image onto the main image, and substitutes the calculated pixel value of the auxiliary image for the defect area of the main image.

In detail, as stated above, the image pickup device 141 may include a predetermined defect area that is pre-set by a manufacturer, for example. Therefore, the main image may be picked up such that it includes the predetermined defect area of the image pickup device 141. Accordingly, when the auxiliary image is picked up by the image pickup device 141, the auxiliary image is mapped to the main image to calculate a displacement between the auxiliary image and the main image. Then, based on the displacement, a pixel value of the auxiliary image that corresponds to a position of the defect area of the main image is calculated. Finally, the calculated pixel value of the auxiliary image is substituted for the defect area of the main image in order to generate a final corrected image.

Furthermore, a plurality of defect areas of the image pickup device 141 may exist, such that the image compensation unit 170 may perform the above-described compensation operation with respect to the plurality of respective defect areas of the image pickup device 141. The auxiliary image may be a full-frame image, a small-size live-view image, or a full-size live-view image, and the main image may be a full-frame image.

The image compensation unit 170 may perform signal processing, such as digital zooming to perform format conversion and image scaling with respect to the image output from the image pickup unit 140 or the image having been corrected with respect to the defect area, AWB, AF, and AE. Furthermore, the image compensation unit 170 may generate a moving image file by combining an audio signal received through a microphone 10 with the plurality of images, and may store the generated moving image file in the storage unit 130. The microphone 10 may be an internal component of the image compensation unit 170, or may be externally connected thereto.

The control unit 180 may control respective operations of the components within the image pickup apparatus 100. Specifically, the control unit 180 may control the image pickup unit 140 to pick up the live-view image (i.e., the image viewed in real-time) to correspond to the user's live-view display operation, and control the user interface unit 120 to display the picked up live-view image.

Further, if a pickup command (i.e., a shutter command) is input during the live-view display, the control unit 180 may store the live-view image being displayed as the auxiliary image in the storage unit 130, and then may control the image pickup unit 140 to pick up the main image that is the full-frame image after the auxiliary image is stored. Further, the control unit 180 may control the image compensation unit 170 to substitute a pixel value of the auxiliary image that corresponds to the defect area of the image pickup device 141, for the defect area of the main image.

Further, if a pickup command is input from the user without live-view display operation, the control unit 180 may control the image pickup unit 140 to pick up a plurality of full-frame images and control the image compensation unit 170 to substitute the pixel value of another full-frame image (i.e., the auxiliary image) for the defect area of one of the plurality of picked up full-frame images (i.e., the main image).

Further, the control unit 180 may control the sensing unit 150 to sense whether the image pickup apparatus 100 moves, and if it is predicted that the image pickup apparatus 100 is not moved during the continuous pickup process, that is, if it is predicted that the image pickup apparatus 100 is fixed to a tripod, etc., the control unit 180 may control the OIS unit 160 so that the mutual displacement exists between the plurality of picked images.

As described above, the image pickup apparatus 100 according to FIG. 1 may correct a deterioration of picture quality due to a defect of the image pickup unit 140 through continuously picking up the plurality of images having mutual displacement.

FIG. 1 illustrates that the image compensation unit 170 and the control unit 180 are separate components in communication with each other. However, the control unit 180 may include functions of the image compensation unit 170 to be implemented by a combined configuration thereof on a single chip (e.g., a System on a Chip (SOC)), as illustrated in FIG. 2.

FIG. 2 is a diagram illustrating a detailed configuration of the image pickup unit 140 and the control unit 180 of FIG. 1.

Referring to FIG. 2, the image pickup unit 140 may include the image pickup device 141, a timing generation unit (a.k.a., a timing generator) 142, a high-speed serial 143, and a lens unit 144.

The image pickup device 141 performs photoelectric conversion of the light incident through the lens unit 144 into an electrical signal. Further, the image pickup device 141 may convert the photoelectrically converted analog signal into a digital signal using a built-in analog-to-digital (A/D) converter 145. However, the A/D converter 145 may be provided externally from the image pickup device 141. As mentioned above, the image pickup device 141 may be a CCD or a CMOS.

The timing generation unit 142 controls the image pickup operation of the image pickup device 141. Specifically, the timing generation unit 142 may generate control signals to control a reset time of the image pickup device 141 and a read time of the photoelectrically converted electric signal, and provide the generated control signals to the image pickup device 141.

The high-speed serial 143 may transmit the digital signal of the image pickup device 141 to the control unit 180. Referring to FIG. 2, the signal generated by the image pickup device 141 is transferred to the control unit 180 in a serial method. However, the signal generated by the image pickup device 141 may be transferred to the control unit 180 via parallel communication.

The lens unit 144 gathers the light from the object and forms an optical image on the image pickup area.

The control unit 180 may receive an image from the image pickup unit 140, correct the input image, and store the corrected image in the storage unit 130. Specifically, the control unit 180 may include a preprocessor 181, a bus 182, an image processing chain 183, a memory controller 184, a codec 185, a compensation processor 186, a display processor 187, and a central processing unit (CPU) 188.

The preprocessor 181 controls the image pickup operation of the image pickup unit 140. Specifically, the preprocessor 181 may control the image pickup unit 140 to generate a live-view image to correspond to the user's live-view display operation, and transmit the live-view image that is received from the image pickup unit 140 to the display processor 187 so that the generated live-view image is displayed on the user interface unit 120.

Further, the preprocessor 181 may control the image pickup unit 140 to generate a plurality of images to correspond to the user's shutter command, and transmit the plurality of images that are received from the image pickup unit 140 to the compensation processor 186 so that the defect area of one of the plurality of generated images is compensated for using another image.

The bus 182 transmits signals between the respective components within the control unit 180.

The image processing chain 183 may perform signal processing, such as digital zooming to adjust format conversion and image scale with respect to the image, AWB, AF, and AE.

The memory controller 184 controls an operation of a volatile memory.

The codec 185 encodes the plurality of images to generate the plurality of images that are picked up by the image pickup unit 140 when the image pickup apparatus 100 performs a moving image capturing operation. Although audio signal reception is not described in this exemplary embodiment, the codec 185 may generate a moving image file by combining an audio signal received through a separate internal or external microphone 10 with the plurality of picked up images.

The compensation processor 186 compensates for the defect area in one image (i.e., the main image) of the plurality of picked images using another image (i.e., auxiliary image). Specifically, in order to map one image of the plurality of images (hereinafter referred to as an "auxiliary image") onto another image (hereinafter referred to as a "main image"), the compensation processor 186 compensates for the position of the auxiliary image as much as the displacement sensed by the sensing unit 150, calculates a pixel value of the auxiliary image that corresponds to the position of the defect area of the main image by mapping the compensated auxiliary image onto the main image, and substitutes the calculated pixel value of the auxiliary image for the defect area of the main image.

The display processor 187 may generate a user interface window to be displayed on the user interface unit 120 or control the operation of the user interface unit 120.

The CPU 188 controls the respective components in the control unit 180.

Although FIG. 2 illustrates that the image processing chain 183 and the compensation processor 186 are separately configured, the image processing chain 183 and the compensation processor 186 may be implemented in a single component or on a single chip.

Figure 3:
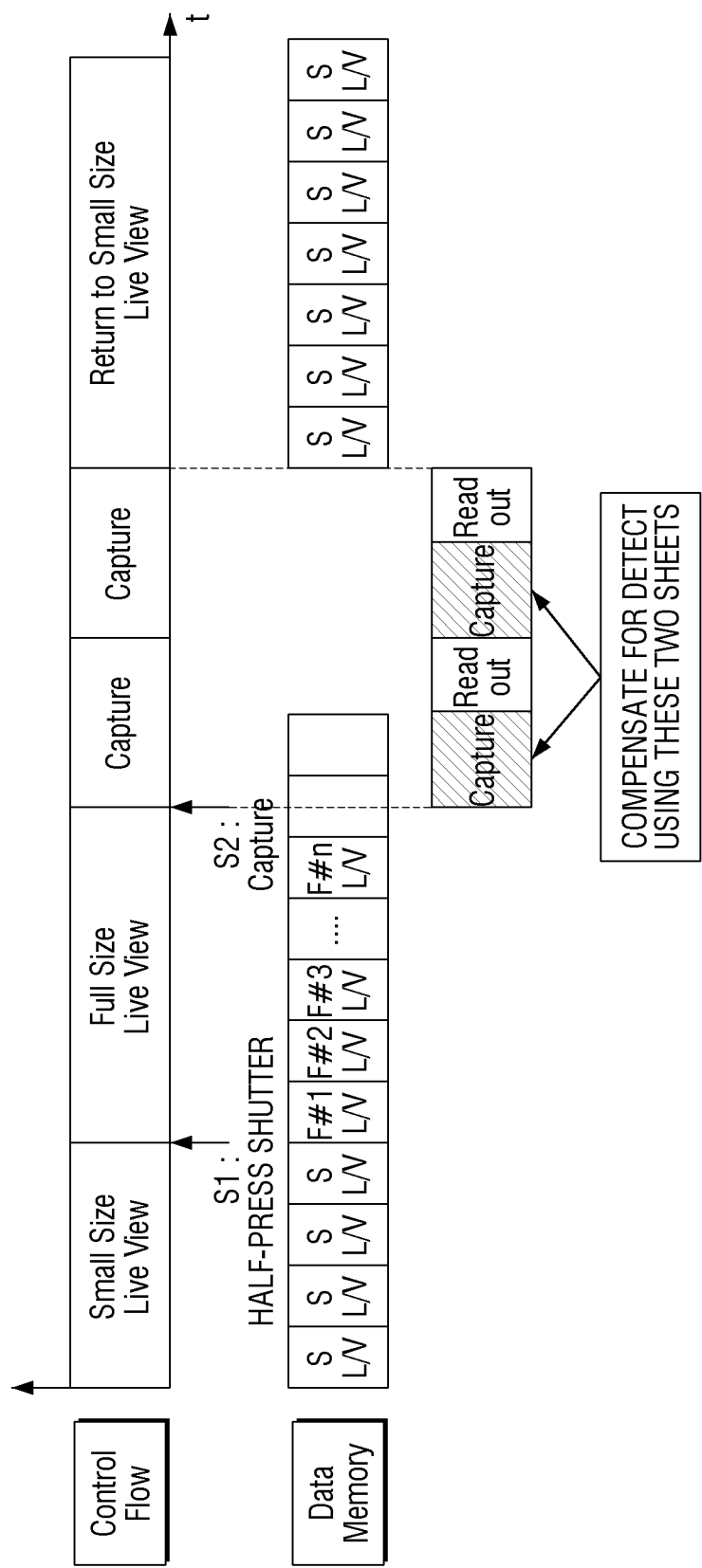
FIG. 3 is a diagram illustrating an operation of an image pickup apparatus according to an exemplary embodiment of the present general inventive concept.

FIG. 3 is a diagram illustrating an operation of an image pickup apparatus 100 according to an exemplary embodiment of the present general inventive concept.

Specifically, FIG. 3 illustrates an operation of using another full-frame image in order to compensate for the defect area of one full-frame image.

Referring to FIG. 3, if a live-view display command is input by the user, the control unit 180 controls the image pickup unit 140 and the user interface unit 120 to perform a small-size live-view function. Specifically, the image pickup unit 140 continuously picks up and transmits the small-size live-view image, and the user interface unit 120 displays the transmitted small-size live-view image.

Thereafter, if a half-press shutter is input by the user, the control unit 180 controls the image pickup unit 140 and the user interface unit 120 to perform the full-size live-view function. Specifically, the image pickup unit 140 continuously picks up and transmits the full-size live-view image, and the user interface unit 120 displays the transmitted full-size live-view image.

If a shutter is input after a half-press shutter, the control unit 180 controls the image pickup unit 140 to continuously generate a plurality of full-frame images. The first picked full-frame image may be used as a main image, and the last picked full-frame image may be used as an auxiliary image. Further, the control unit 180 may control the image compensation unit 170 to substitute the pixel value of the auxiliary image for the defect area of the main image.

Although the first picked full-frame image is used as the main image it is also possible to use the second full-frame image as the main image.

Although FIG. 3 illustrates that two full-frame images are generated it is also possible to generate three or more full-frame images and to substitute pixel values of two or more full-frame images for the defect area of one full-frame image using three or more full-frame image.

As described above, in order to compensate for the defect area of one full-frame image, other full-frame images are used. However, as illustrated in FIG. 4 as follows, the auxiliary image may not be a full-frame image, but instead may be a live-view image.

Figure 4:
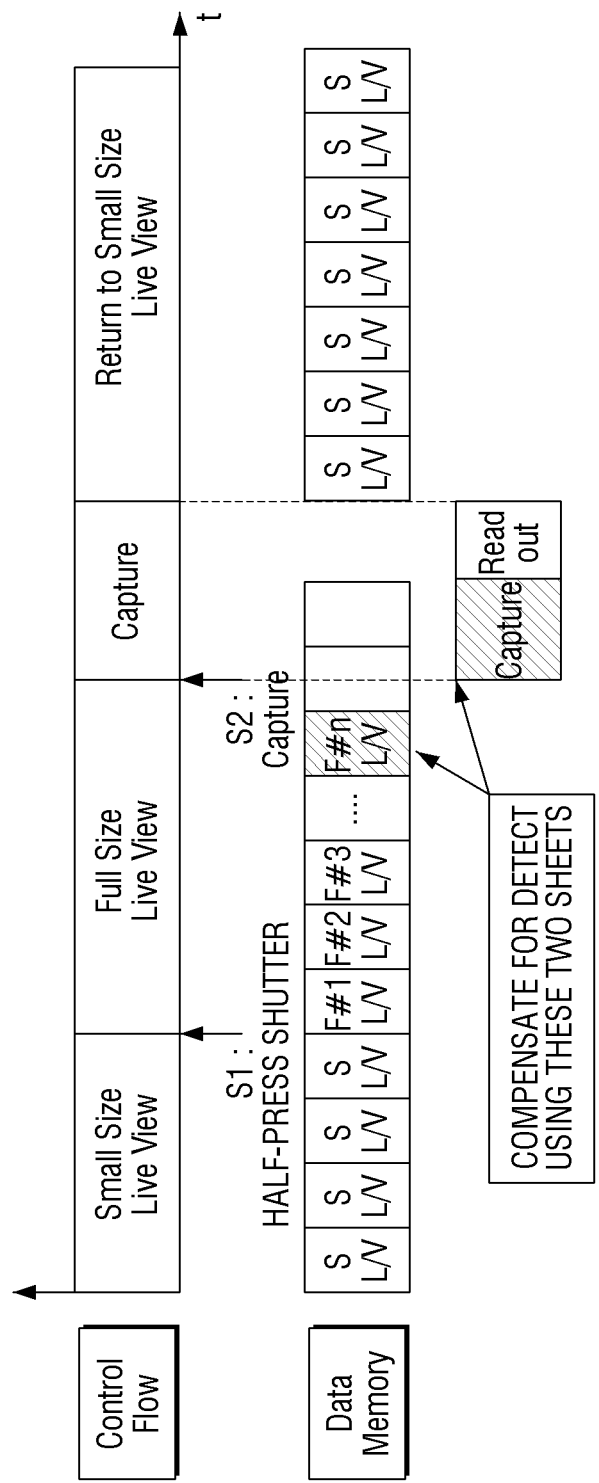
FIG. 4 is a diagram illustrating an operation of an image pickup apparatus according to another exemplary embodiment of the present general inventive concept.

FIG. 4 is a diagram illustrating an operation of an image pickup apparatus 100 according to another exemplary embodiment of the present general inventive concept.

Specifically, FIG. 4 illustrates an operation using a full-size live-view image in order to compensate for the defect area of one full-frame image.

Referring to FIG. 4, if a live-view display command is input by the user, the control unit 180 controls the image pickup unit 140 and the user interface unit 120 to perform a small-size live-view function. Specifically, the image pickup unit 140 continuously picks up and transmits the small-size live-view image, and the user interface unit 120 displays the transmitted small-size live-view image.

Thereafter, if a half-press shutter is input by the user, the control unit 180 controls the image pickup unit 140 and the user interface unit 120 to perform the full-size live-view function. Specifically, the image pickup unit 140 continuously picks up and transmits the full-size live-view image, and the user interface unit 120 displays the transmitted full-size live-view image.

If a shutter is input after a half-press shutter, the control unit 180 controls the image pickup unit 140 to generate the full-frame image. The picked up full-frame image may be used as a main image, and the full-size live-view image just before the shutter command is used as an auxiliary image. Further, the control unit 180 may control the image compensation unit 170 to substitute the pixel value of the auxiliary image for the defect area of the main image.

Although one full-size live-view image is used as the auxiliary image in FIG. 4, two or more full-size live-view image may be used. For example, two or more full-size live-view image just before the shutter command may be used as the auxiliary image.

Also, FIG. 4 illustrates that the live-view image just before the full-frame image is used. However, as illustrated in FIG. 5 as follows, it is also possible to use the live-view image after the pickup of the full-frame image.

Figure 5:
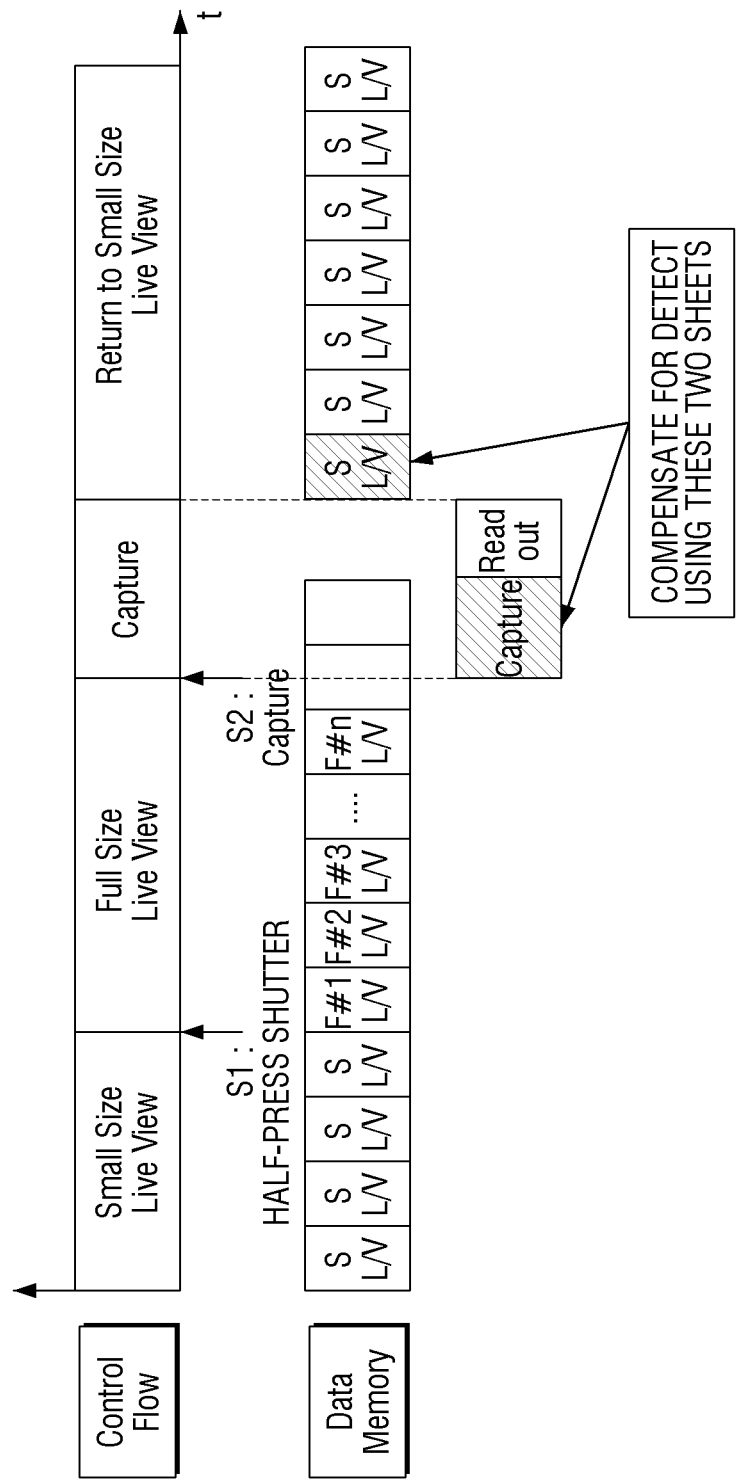
FIG. 5 is a diagram illustrating an operation of an image pickup apparatus according to another exemplary embodiment of the present general inventive concept.

FIG. 5 is a diagram illustrating an operation of an image pickup apparatus 100 according to another exemplary embodiment of the present general inventive concept.

Specifically, FIG. 5 illustrates an operation using a small-size live-view image in order to compensate for the defect area of one full-frame image.

Referring to FIG. 5, if a live-view display command is input by the user, the control unit 180 controls the image pickup unit 140 and the user interface unit 120 to perform a small-size live-view function. Specifically, the image pickup unit 140 continuously picks up and transmits the small-size live-view image, and the user interface unit 120 displays the transmitted small-size live-view image.

Thereafter, if a half-press shutter is input by the user, the control unit 180 controls the image pickup unit 140 and the user interface unit 120 to perform the full-size live-view function. Specifically, the image pickup unit 140 continuously picks up and transmits the full-size live-view image, and the user interface unit 120 displays the transmitted full-size live-view image.

If a shutter is input after a half-press shutter, the control unit 180 controls the image pickup unit 140 to generate the full-frame image. The picked full-frame image may be the main image.

Further, after the generation of the full-frame image, the control unit 180 controls the image pickup unit 140 and the user interface unit 120 to perform the small-size live-view function. The small-size live-view image after the shutter command is used as an auxiliary image. Further, the control unit 180 may control the image compensation unit 170 to substitute the pixel value of the auxiliary image for the defect area of the main image.

Although one small-size live-view image is used as the auxiliary image in FIG. 5, two or more small-size live-view image may be used. For example, two or more small-size live-view image after the shutter command may be used as the auxiliary image.

Also, the live-view image at one time point (e.g., just before or after the shutter command) is used in FIGS. 4 and 5. However, the full-size live-view image just before the shutter command and the auxiliary-size live-view image after the shutter command may be used as the auxiliary images.

Figure 6:
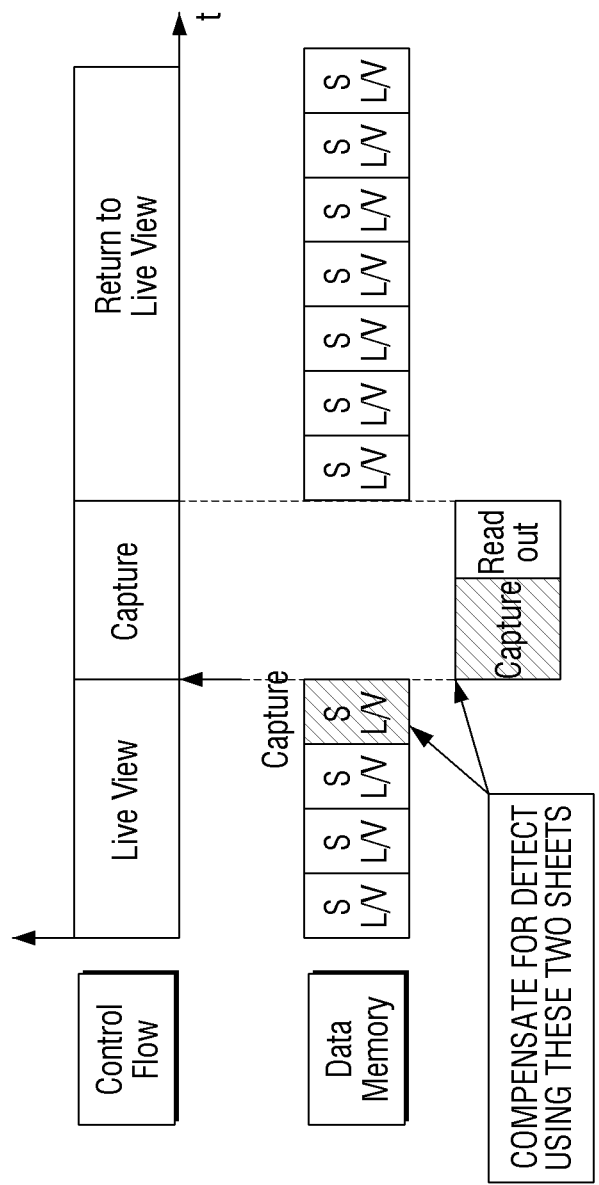
FIG. 6 is a diagram illustrating an operation of an image pickup apparatus according to another exemplary embodiment of the present general inventive concept.

Although FIGS. 4 and 5 illustrated embodiments where the shutter is input after a half-press shutter, the shutter may be input without the half-press shutter, as illustrated in FIG. 6, as follows.

FIG. 6 is a diagram illustrating an operation of an image pickup apparatus 100 according to another exemplary embodiment of the present general inventive concept.

Specifically, FIG. 6 illustrates an operation using a small-size live-view image (hereinafter referred to as an "auxiliary image") in order to compensate for the defect area of one full-frame image (hereinafter referred to as a "main image").

Referring to FIG. 6, if a live-view display command is input by the user, the control unit 180 controls the image pickup unit 140 and the user interface unit 120 to perform a small-size live-view function. Specifically, the image pickup unit 140 continuously picks up and transmits the small-size live-view image, and the user interface unit 120 displays the transmitted small-size live-view image.

Thereafter, if a shutter is input, the control unit 180 controls the image pickup unit 140 to generate a full-frame image. The picked full-frame image is the main image, and the small-size live-view image is used as the auxiliary image. Further, the control unit 180 may control the image compensation unit 170 to substitute the pixel value of the auxiliary image for the defect area of the main image.

Although one small-size live-view image is used as the auxiliary image in FIG. 6, two or more small-size live-view image may be used. Further, the small-size live-view image just before the shutter command and the auxiliary-size live-view image after the shutter command may be used as the auxiliary images.

FIGS. 7 through 9D are diagrams illustrating an operation of the image compensation unit as illustrated in FIG. 1.

Figure 7:
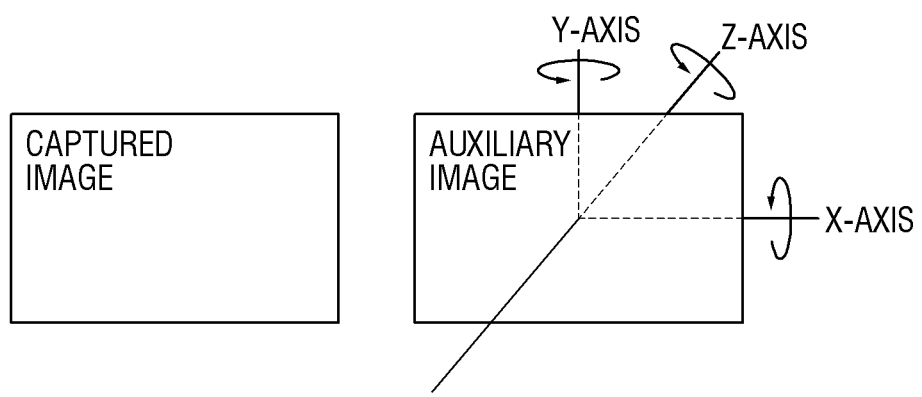
Figure 8:
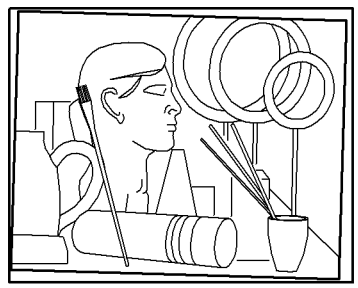
Figure 8:
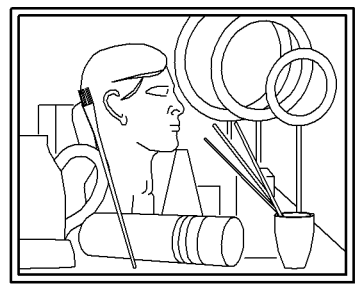
Figure 8:
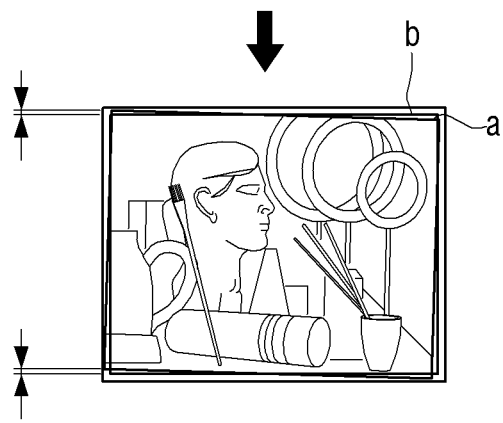
Figure 9:
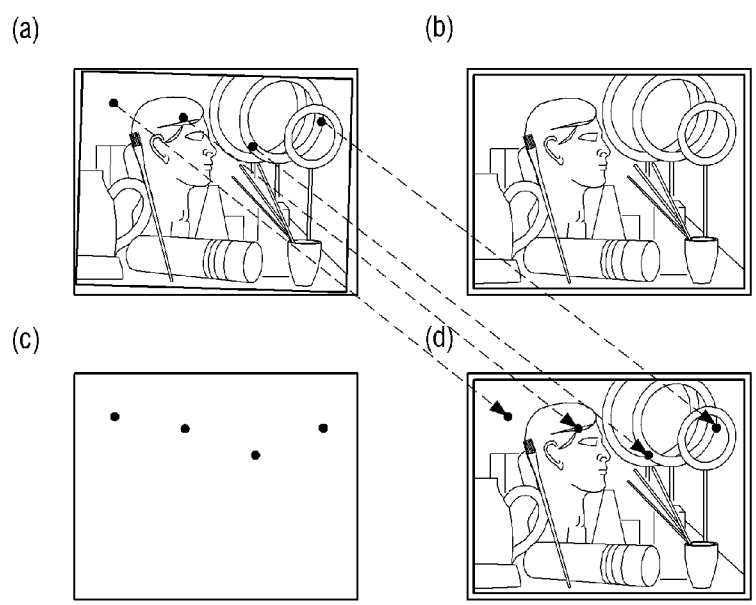

Referring to FIG. 7, two continuously picked up images are illustrated.

Here, the picked up image is the main image that is the full-frame image, and the auxiliary image is the auxiliary image that is used to compensate for the defect area of the main image.

Since the main image and the auxiliary image have the mutual displacement, the image compensation unit 170 compensates for the position of the auxiliary image as much as the displacement between the main image and the auxiliary image. For example, if there exists a displacement as much as "a" on the x axis between the main image and the auxiliary image, the position of the auxiliary image may be corrected as much as "-a" on the x axis.

Also, the displacement between the main image and the auxiliary image may be sensed by the sensing unit 150 or using a known displacement sensing algorithm. For example, as illustrated in FIGS. 8A through 8C, by mapping the auxiliary image (FIG. 8A) onto the main image (FIG. 8B), the displacement (a, b) between the main image and the auxiliary image may be discovered, as illustrated in FIG. 8C.

Further, by mapping the compensated auxiliary image and main image, the pixel value of the auxiliary image that corresponds to the position of the defect area of the main image can be calculated. This will be described with reference to FIGS. 9A through 9D.

Referring to FIGS. 9A through 9D, FIG. 9A illustrates an auxiliary image, FIG. 9B illustrates a main image, FIG. 9C illustrates positions of defect areas, and FIG. 9D illustrates a corrected main image.

Referring to FIG. 9C, positions of the defect areas may correspond to values that may be provided in advance by a manufacturer, and if the displacement is known through the above-described operation, the pixel positions of the auxiliary image that correspond to the positions of the defect areas of the main image can be calculated.

Accordingly, the main image can be corrected by calculating the pixel value that corresponds to the calculated pixel position of the auxiliary image and substituting the calculated pixel value for the defect area of the main image as illustrated in FIG. 9D. For example, if the defect area of the main image corresponds to one pixel (x, y), the pixel position (x', y') of the auxiliary image that correspond to the pixel (x, y) of the main image is calculated, and the pixel value (x', y') of the auxiliary image is substituted for the pixel value (x, y) of the main image.

Although the pixel value of the auxiliary image is used for the defect area of the main image as it is, the pixel value may be calculated using the pixel of the auxiliary image that corresponds to the defect area of the main image and the neighboring pixel, and in this case, not only the defect area of the main image but also the position of the defect area of the main image and the neighboring pixel can be corrected.

FIG. 10 is a diagram illustrating a storage area of the storage unit 130 of FIG. 1.

Referring to FIG. 10, the storage unit 130 may include an area (0) to store an auxiliary image, an area (1) to store a main image, an area (2) to store a position-compensated auxiliary image, an area (3) to store the position of a defect area of the image pickup device 141, and an area (4) to store a main image having a compensated defect area.

The area (0) to store the auxiliary image is an area to store an image of images picked up by the image pickup unit 140 that is used to correct the main image, and a full-frame image, a full-size live-view image, and a small-size live-view image may be stored in the area (0). The area (0) may also be divided into two sections to store a plurality of live-view images, such that first, third, fifth, etc., images are stored in an "odd" section of the area (0), and second, fourth, sixth, etc., images are stored in an "even" section of the area (0).

The area (1) to store the main image is an area to store an image that is picked up by the image pickup unit 140 as the full-frame image, and a full-frame image is stored in the area (1).

The area (2) to store the position-compensated auxiliary image is an area to store the auxiliary image whose position is moved by the image compensation unit 170.

The area (3) to store the position of the defect area of the image pickup device 141 is an area to store position information of a white pixel defect area of the image pickup device 141, a black pixel defect area of the image pickup device 141, and an AF phase-difference defect area.

The area (4) to store the main image having a compensated defect area is an area to store the main image of which the defect area is compensated for by the image compensation unit 170.

Figure 11:
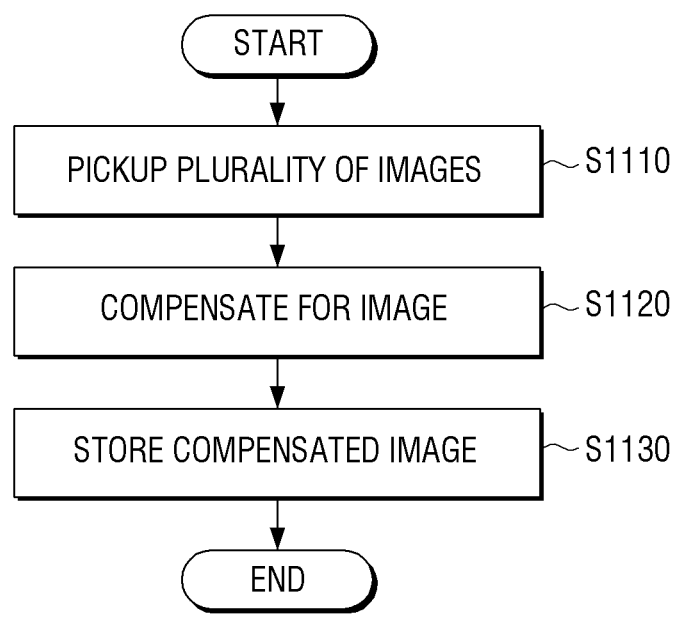
FIG. 11 is a flowchart illustrating a method of performing image compensation according to an exemplary embodiment of the present general inventive concept.

FIG. 11 is a flowchart illustrating a method of performing image compensation according to an exemplary embodiment of the present general inventive concept.

Referring to FIG. 11, a plurality of images having mutual displacement is continuously picked up using the image pickup device 141 (operation S1110). The detailed image pickup operation will be described later with reference to FIG. 12.

Then, the plurality of picked up images are stored (operation S1120). Specifically, the plurality of picked up images may be temporarily stored in accordance with a pickup order or a type of pickup (or operation state).

Then, a defect area in one of the plurality of picked up images is compensated for using the other picked up image (operation S1130). Specifically, in order to map one image (hereinafter referred to as an "auxiliary image") of the plurality of images onto the other image (hereinafter referred to as a "main image"), the position of the auxiliary image is moved as much as the sensed displacement, the pixel value of the auxiliary image that corresponds to the position of the defect area of the main image is calculated by mapping the moved auxiliary image onto the main image, and the calculated pixel value of the auxiliary image is substituted for the defect area of the main image.

Figure 12:
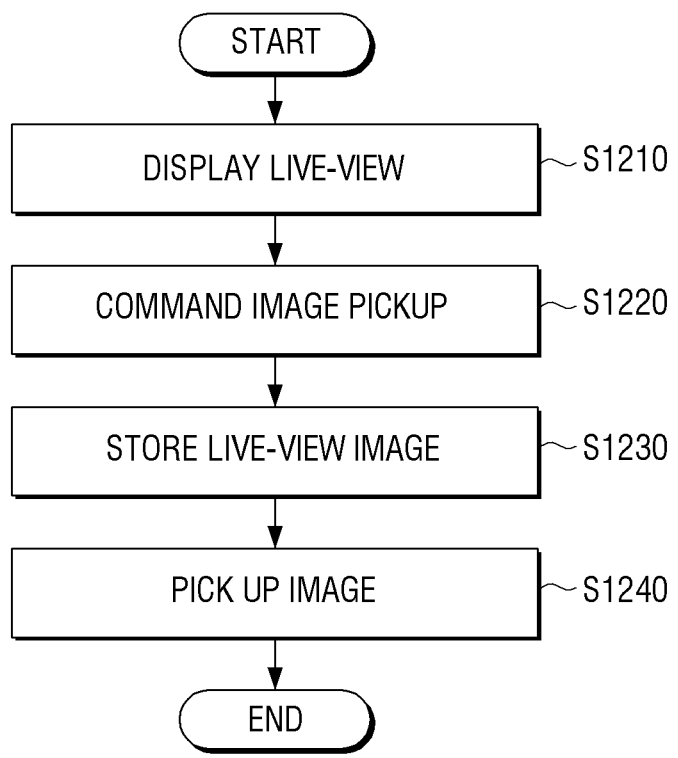
FIG. 12 is a flowchart illustrating in detail an image pickup operation in FIG. 11.

FIG. 12 is a flowchart illustrating in detail the image pickup operation S1110 as illustrated in FIG. 11.

Referring to FIG. 12, a live-view image is first displayed (operation S1210). Specifically, the live-view image can be picked up and displayed via a user's live-view display command.

Thereafter, if an image pickup command is input (operation S1220), the live-view image just before the image pickup command is stored as the auxiliary image (operation S1230).

Then, an image pickup operation is performed to generate a full-frame image (operation S1240). The image that is picked up through this operation is stored as the main image.

Although the image pickup operation as illustrated in FIG. 6 has been described with reference to FIG. 12, a plurality of images can be picked up by the image pickup operation as illustrated in FIGS. 3 through 5.

As described above, according to the method of performing image compensation according to the exemplary embodiments of the present general inventive concept, a deterioration of picture quality of an image due to a defect corresponding to an image sensor can be corrected by continuously picking up a plurality of images having mutual displacement and substituting a pixel value of another image to correspond to the defect area in one image. The method of performing image compensation as illustrated in FIG. 10 or 11 may be performed by an image pickup apparatus 100 having the configuration of FIG. 1, but is not limited thereto.

The present general inventive concept, such as the method of performing image compensation as described above, can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image pickup apparatus, comprising:
   an image pickup unit to continuously pick up a plurality of images having a mutual displacement therebetween using an image pickup device;
   a storage unit to store a position of a defect area of the image pickup device;
   an image compensation unit to compensate for the defect area in one of the plurality of picked up images using another one of the plurality of picked up images;
   a user interface unit to display a live-view image picked up by the image pickup unit; and
   a control unit to control the image pickup unit to pick up a full-frame image through a shutter operation after the live-view image being displayed is stored as the another one of the plurality of picked up images if a shutter command is input while the live-view is displayed and to control the image pickup unit to pick up a plurality of full-frame images through a shutter operation if a shutter command is input without the live-view display operation.

2. The image pickup apparatus as claimed in claim 1, wherein:
   the plurality of picked up images include a first image and a second image, and
   the image compensation unit compensates for the first image according to the mutual displacement, calculates a pixel value of the compensated first image that corresponds to the defect area of the second image, and substitutes the calculated pixel value for the defect area of the second image.

3. The image pickup apparatus as claimed in claim 1, wherein each of the plurality of picked up images is a full-frame image through a shutter operation.

4. The image pickup apparatus as claimed in claim 1, wherein:
   at least one of the plurality of picked up images is a full-frame image through a shutter operation, and
   the other of the plurality of picked up images is a live-view image for live-view display.

5. The image pickup apparatus as claimed in claim 4, wherein the live-view image is a small-size live-view that is displayed when a shutter is released or a full-side live-view that is displayed when a half-press shutter is input.

6. The image pickup apparatus as claimed in claim 4, wherein the live-view image is an image that is picked up just before the full-frame image is picked up.

7. The image pickup apparatus as claimed in claim 4, wherein the live-view image is an image that is picked up after the full-frame image is picked up.

8. The image pickup apparatus as claimed in claim 1, further comprising:
   a sensing unit to sense movement of the image pickup apparatus; and
   an OIS (Optical Image Stabilizer) unit to move an image pickup direction of the image pickup apparatus as much as a preset displacement so that the mutual displacement exists between the plurality of picked images if the movement of the image pickup apparatus is not sensed.

9. The image pickup apparatus as claimed in claim 1, wherein the storage unit stores a position of at least one of a white pixel defect area of the image pickup device, a black pixel defect area of the image pickup device, and an AF phase-difference defect area.

10. A method of performing image compensation in an image pickup apparatus, comprising:
    continuously picking up and storing a plurality of images having mutual displacement therebetween using an image pickup device;
    compensating for a defect area in one of the plurality of picked up images using another one of the plurality of picked up images; and
    displaying a live-view image picked up by the image pickup unit,
    wherein the picking up and storing includes picking up and storing a full-frame image through a shutter operation after the live-view image being displayed is stored as the another one of the plurality of picked up images if a shutter command is input while the live-view is displayed and a plurality of full-frame images through a shutter operation if a shutter command is input without the live-view display operation.

11. The method of performing image compensation as claimed in claim 10, wherein:
    the plurality of picked up images include a first image and a second image, and
    the compensating includes moved the first image according to the mutual displacement, calculating a pixel value of the moved first image that corresponds to the defect area of the second image, and substituting the calculated pixel value for the defect area of the second image.

12. The method of performing image compensation as claimed in claim 10, wherein each of the plurality of picked up images is a full-frame image through a shutter operation.

13. The method of performing image compensation as claimed in claim 10, wherein:
    at least one of the plurality of picked up images is a full-frame image through a shutter operation, and
    the other of the plurality of picked up images is a live-view image for live-view display.

14. The method of performing image compensation as claimed in claim 13, wherein the live-view image is a small-size live-view that is displayed when a shutter is released or a full-side live-view that is displayed when a half-press shutter is input.

15. The method of performing image compensation as claimed in claim 13, wherein the live-view image is an image that is picked up just before the full-frame image is picked up.

16. The method of performing image compensation as claimed in claim 13, wherein the live-view image is an image that is picked up after the full-frame image is picked up.

17. The method of performing image compensation as claimed in claim 10, further comprising:
    sensing movement of the image pickup apparatus; and
    moving an image pickup direction of the image pickup apparatus as much as a preset displacement so that the mutual displacement exists between the plurality of picked images if the movement of the image pickup apparatus is not sensed.

18. The method of performing image compensation as claimed in claim 10, wherein the defect area is at least one of a white pixel defect area of the image pickup device, a black pixel defect area of the image pickup device, and an AF phase-difference defect area.

19. A non-transitory computer readable recording medium including computer-readable codes to execute a method of performing image compensation, wherein the method of performing image compensation comprises:
   continuously picking up and storing a plurality of images having mutual displacement therebetween using an image pickup device;
   compensating for a defect area in one of the plurality of picked up images using another one of the plurality of picked up images; and
   displaying a live-view image picked up by the image pickup unit,
   wherein the picking up and storing includes picking up and storing a full-frame image through a shutter operation after the live-view image being displayed is stored as the another one of the plurality of picked up images if a shutter command is input while the live-view is displayed and a plurality of full-frame images through a shutter operation if a shutter command is input without the live-view display operation.

* * * * *